United States Patent
Tomomatsu

(10) Patent No.: US 10,850,695 B2
(45) Date of Patent: Dec. 1, 2020

(54) VEHICLE FRONT STRUCTURE AND METHOD OF PRODUCING THE SAME

(71) Applicant: TOYOTA JIDOSHA KABUSHIKI KAISHA, Aichi-ken (JP)

(72) Inventor: Yuki Tomomatsu, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/278,680

(22) Filed: Feb. 18, 2019

(65) Prior Publication Data
US 2019/0256020 A1   Aug. 22, 2019

(30) Foreign Application Priority Data
Feb. 19, 2018 (JP) ................. 2018-026590

(51) Int. Cl.
*B60R 19/24* (2006.01)
*B60R 19/18* (2006.01)
*B60R 19/34* (2006.01)

(52) U.S. Cl.
CPC ............. *B60R 19/18* (2013.01); *B60R 19/34* (2013.01); *B60R 2019/186* (2013.01)

(58) Field of Classification Search
CPC ............. B60R 19/34; B60R 2019/186; B60R 2019/1873; B60R 19/18
USPC ........................................ 293/133, 120–122
See application file for complete search history.

(56) References Cited

U.S. PATENT DOCUMENTS

| | | | |
|---|---|---|---|
| 4,509,782 A * | 4/1985 | Manning | B60R 19/22 293/109 |
| 5,100,187 A * | 3/1992 | Loren | B60R 19/18 264/572 |
| 6,685,243 B1* | 2/2004 | Evans | B60R 19/18 293/102 |
| 7,866,716 B2* | 1/2011 | Perucca | B60R 19/18 293/102 |
| 9,415,735 B1* | 8/2016 | Baccouche | B60R 19/34 |

FOREIGN PATENT DOCUMENTS

JP    5341607       * 11/2013
JP    2015-3653 A    1/2015

* cited by examiner

*Primary Examiner* — Dennis H Pedder
(74) *Attorney, Agent, or Firm* — Hauptman Ham, LLP

(57) ABSTRACT

A vehicle front structure includes a crash box and an absorber. The crash box is provided between a front end of a front side member extending in a vehicle front-rear direction, and a bumper reinforcement extending in a vehicle width direction. The absorber is provided forward of the bumper reinforcement in the vehicle front-rear direction and extends in the vehicle width direction. In the vehicle width direction, an outer end of the crash box in the vehicle width direction is positioned outward of an outer end of the bumper reinforcement in the vehicle width direction, and in the vehicle width direction, an outer end of the absorber in the vehicle width direction is positioned outward of the outer end of the bumper reinforcement in the vehicle width direction.

3 Claims, 3 Drawing Sheets

VEHICLE FRONT STRUCTURE AND METHOD OF PRODUCING THE SAME

INCORPORATION BY REFERENCE

The disclosure of Japanese Patent Application No. 2018-026590 filed on Feb. 19, 2018 including the specification, drawings and abstract is incorporated herein by reference in its entirety.

BACKGROUND

1. Technical Field

The disclosure relates to a vehicle front structure in which, in a vehicle width direction, an outer end of a crash box in the vehicle width direction is positioned outward of an outer end of a bumper reinforcement in the vehicle width direction, and a method of producing the same.

2. Description of Related Art

Japanese Unexamined Patent Application Publication No. 2015-003653 (JP 2015-003653 A) discloses a vehicle front structure that includes a crash box provided between a front end of a front side member and a bumper reinforcement (bumper member), and an absorber provided forward of the bumper reinforcement (bumper member) in a vehicle front-rear direction.

In the structure disclosed in JP 2015-003653 A, in a vehicle width direction, an outer end of the crash box in the vehicle width direction is positioned inward of an outer end of the bumper reinforcement in the vehicle width direction.

However, in some cases, in the vehicle width direction, depending on the vehicle, the outer end of the crash box in the vehicle width direction is positioned outward of the outer end of the bumper reinforcement in the vehicle width direction. In the cases, when the crash box is crushed by the load input from the collision barrier, and an edge projecting outward in the vehicle width direction is created in the crash box, it is difficult to cover the edge with the bumper reinforcement. As a result, it is likely that the edge comes into contact with the collision barrier.

SUMMARY

The disclosure provides a vehicle front structure capable of suppressing contact of an edge created in a crash box with a collision barrier when, in a vehicle width direction, an outer end of the crash box in the vehicle width direction is positioned outward of an outer end of a bumper reinforcement in the vehicle width direction, and a method of producing the same.

A first aspect of the disclosure relates to a vehicle front structure. The vehicle front structure includes a crash box and an absorber. The crash box is provided between a front end of a front side member extending in a vehicle front-rear direction, and a bumper reinforcement extending in a vehicle width direction. The absorber is provided forward of the bumper reinforcement in the vehicle front-rear direction and extends in the vehicle width direction. In the vehicle width direction, an outer end of the crash box in the vehicle width direction is positioned outward of an outer end of the bumper reinforcement in the vehicle width direction. In the vehicle width direction, an outer end of the absorber in the vehicle width direction is positioned outward of the outer end of the bumper reinforcement in the vehicle width direction.

With the vehicle front structure according to the first aspect of the disclosure, in the vehicle width direction, the outer end of the absorber in the vehicle width direction is positioned outward of the outer end of bumper reinforcement in the vehicle width direction. In this way, the projecting of the edge outward of the absorber in the vehicle width direction can be suppressed compared with a case where the outer end of the absorber in the vehicle width direction is positioned to be lined up with or inward of the outer end of the bumper reinforcement in the vehicle width direction, even when the crash box is crushed and the edge projecting outward in the vehicle width direction is created in the crash box. Therefore, even when, in the vehicle width direction, the outer end of the crash box in the vehicle width direction is positioned outward of the outer end of the bumper reinforcement in the vehicle width direction, it is possible to suppress contact of the edge created in the crash box with the collision barrier.

In the vehicle front structure according to the first aspect of the disclosure, in the vehicle width direction, the outer end of the absorber in the vehicle width direction may be positioned outward of the outer end of the crash box in the vehicle width direction.

With the above vehicle front structure, since, in the vehicle width direction, the outer end of the absorber in the vehicle width direction is positioned outward of the outer end of the crash box in the vehicle width direction, it is possible to further suppress the projecting of the edge created in the crash box outward of the absorber in the vehicle width direction. Therefore, it is possible to effectively suppress contact of the edge created in the crash box with the collision barrier.

In the vehicle front structure according to the first aspect of the disclosure, in the vehicle width direction, the outer end of the absorber in the vehicle width direction may be positioned outward of the outer end of the crash box in the vehicle width direction in predicted deformation by an oblique collision.

With the above vehicle front structure, since, in the vehicle width direction, the outer end of the absorber in the vehicle width direction is positioned outward of the outer end of the crash box in the predicted deformation in the oblique collision, it is possible to cover the edge created in the crash box in the oblique collision with the absorber with respect to the front side of the vehicle. Therefore, it is possible to reliably suppress contact of the edge created in the crash box in the oblique collision with the collision barrier.

A second aspect of the disclosure relates to a method of producing a vehicle front structure. The method includes obtaining a position of an outer end of a crash box in a vehicle width direction in predicted deformation by an oblique collision, and fabricating an absorber by determining a length of the absorber in the vehicle width direction such that, in the vehicle width direction, an outer end of the absorber in the vehicle width direction at a normal time is positioned outward of an outer end of the crash box in the vehicle width direction in the predicted deformation by the oblique collision.

In the method of producing the vehicle front structure according to the second aspect, fabricating an absorber by determining the length of the absorber in the vehicle width direction such that, in the vehicle width direction, the outer end of the absorber at the normal time is positioned outward of the outer end of the crash box in the predicted deformation by the oblique collision is included. As a result, even when the crash box is crushed in the oblique collision and an edge projecting outward in the vehicle width direction is created in the crash box, it is possible to cover the edge with the absorber with respect to the front side of the vehicle. Therefore, even when, in the vehicle width direction, the outer end of the crash box in the vehicle width direction is positioned outward of the outer end of the bumper reinforcement in the vehicle width direction, it is possible to reliably suppress contact of the edge created in the crash box in the oblique collision with the collision barrier.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
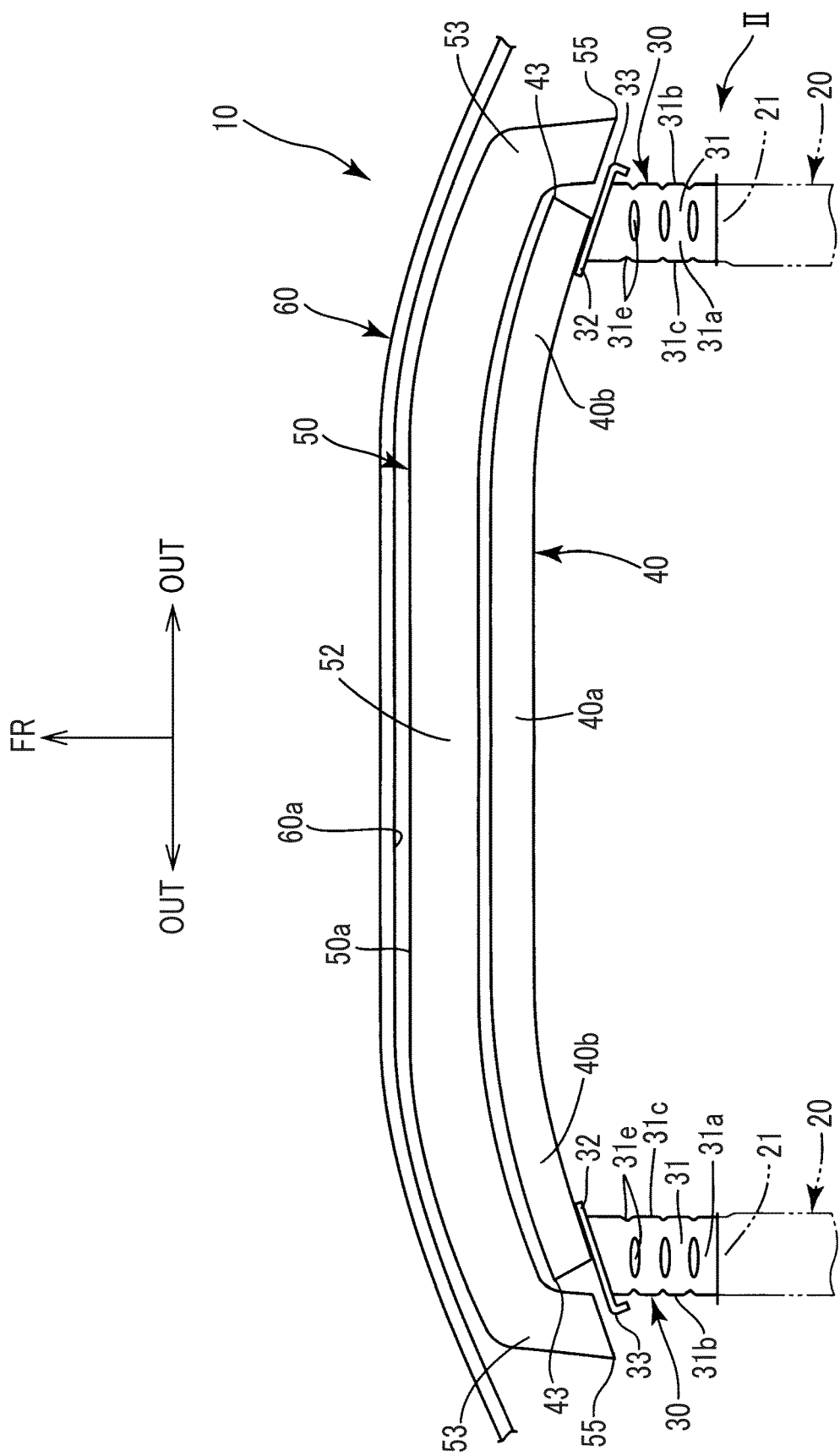
FIG. 1 is a schematic plan view of a vehicle front structure according to an embodiment of the disclosure.

Hereinafter, with reference to the drawings, a vehicle front structure according to an embodiment of the disclosure and a method of producing the same will be described. In the drawings, "FR" indicates the front side of a vehicle, and "OUT" indicates the outer side of the vehicle in a vehicle width direction.

As shown in FIG. 1, the vehicle front structure 10 according to the embodiment of the disclosure includes front side members 20, crash boxes 30, and a bumper reinforcement 40, and an absorber 50.

The front side members 20 are provided to extend in a vehicle front-rear direction on both of the right and left side portion of the vehicle. The front side member 20 is a frame member of the vehicle in which a cross sectional shape orthogonal to the extending direction (transverse cross sectional shape) is a closed cross sectional shape such as a rectangle.

The crash box 30 is provided to absorb energy by being compressed and deformed (crushed) in the vehicle front-rear direction, which is the axial direction, at the time of a collision from the front of the vehicle including an oblique collision. Here, "oblique collision" means the oblique collision defined by the National Highway Traffic Safety Administration (NHTSA) in the United States (a collision at a relative angle of 15° and a relative speed of 90 km/h with respect to a collision barrier 100, and, with a 35% overlap of the vehicle with the collision barrier 100 in the vehicle width direction). The crash box 30 is connected to a front end 21 of the front side member 20. The crash box 30 is disposed between the front end 21 of the front side member 20 and the bumper reinforcement 40. The crash box 30 includes a box main body 31, and a front-side plate 32 provided at a front end of the box main body 31.

The box main body 31 is provided to extend in the vehicle front-rear direction as the axial direction, and its cross sectional shape orthogonal to the extending direction (transverse cross sectional shape) is a closed cross sectional shape. The transverse cross sectional shape of the box main body 31 may be a rectangle or a polygon such as an octagon. The box main body 31 includes a box upper wall 31a, a box outer-side wall 31b, a box inner-side wall 31c, and a box lower wall (not shown). The box outer-side wall 31b extends downward from the outer end of the box upper wall 31a in the vehicle width direction. The box inner-side wall 31c extends downward from the inner end of the box upper wall 31a in the vehicle width direction. The box lower wall connects a lower end of the box outer-side wall 31b and a lower end of the box inner-side wall 31c.

In the box main body 31, a plurality of recession-like beads 31e is formed so as to facilitate axial compression and deformation in the vehicle front-rear direction. The recession-like beads 31e are formed at intervals in the vehicle front-rear direction and the vehicle width direction.

A rear end of the box main body 31 is fixedly attached to the front end 21 of the front side member 20, directly or through at least one plate (not shown). The box main body 31 may be fixed to the front side member 20 by welding, or by coupling using bolts (not shown).

The front-side plate 32 is joined to the front end of the box main body 31, by welding, or the like. The front-side plate 32 has a size larger than the box main body 31 when viewed in the axial direction (vehicle front-rear direction) of the box main body 31 so as to cover the box main body 31 with respect to the front side of the vehicle. Accordingly, in the vehicle width direction, the outer end of the front-side plate 32 in the vehicle width direction is positioned outward of the box main body 31, and in the vehicle width direction, the inner end of the front-side plate 32 in the vehicle width direction is positioned inward of the box main body 31.

Figure 2:
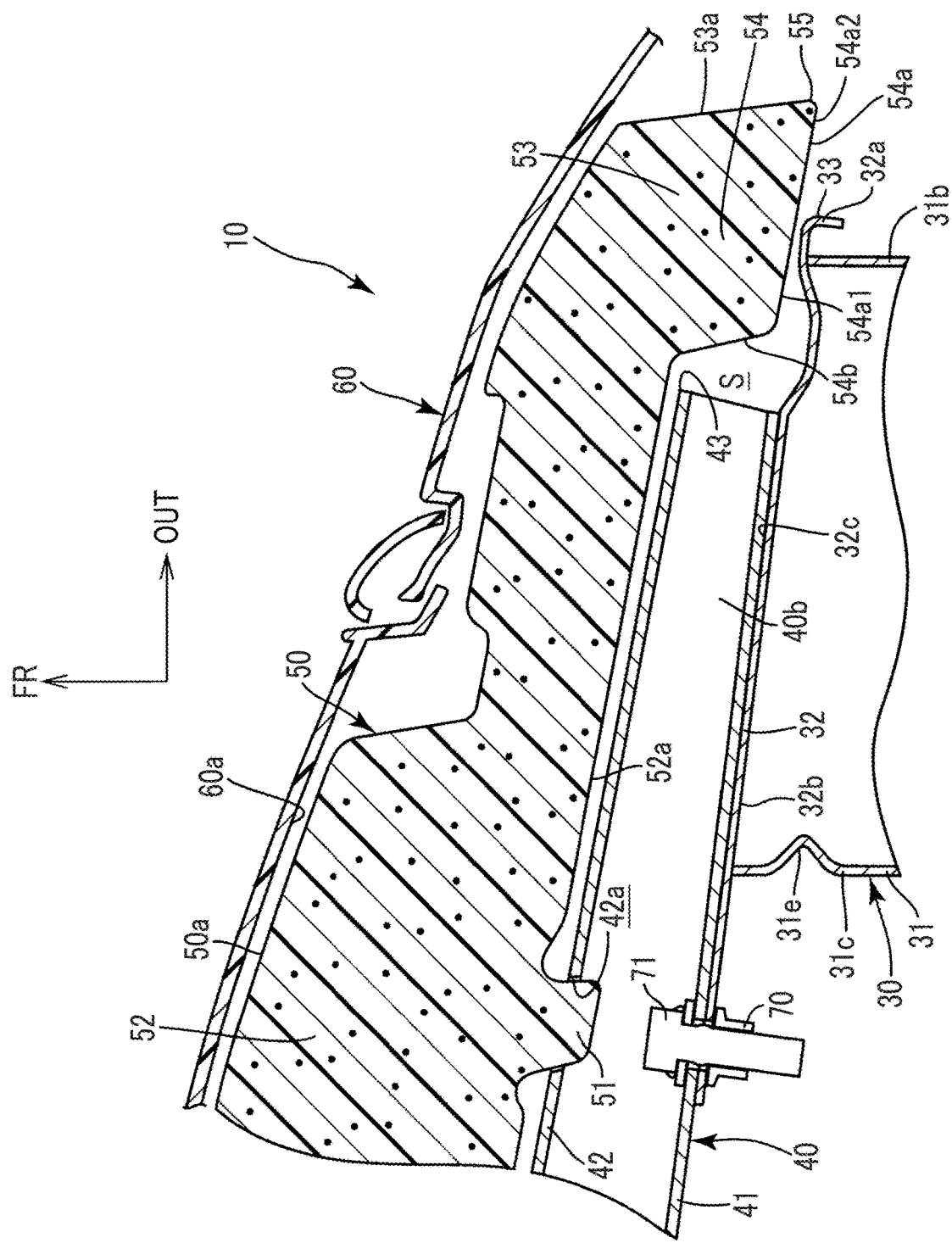
FIG. 2 is an enlarged sectional view of a portion II in FIG. 1.

As shown in FIG. 2, a weld nut 70 is joined to a rear-side surface 32b of the front-side plate 32. The weld nut 70 is joined to the front-side plate 32, for example, by crushing and welding projections (not shown) formed on the weld nut 70 by projection welding or the like. In a state where the weld nut 70 is joined, the front-side plate 32 is fixedly attached to a rear wall 41 of the bumper reinforcement 40 directly or through a separate member (not shown) by screwing a bolt 71 with the weld nut 70.

A bending portion 32a that is bent toward the rear side of the vehicle is formed at the outer end of the front-side plate 32 in the vehicle width direction such that the corner has an R shape. The outer end 33 of the crash box 30 in the vehicle width direction at the normal time, other than the time of collision, is at the bending portion 32a of the front-side plate 32.

In the vehicle width direction, the outer end 33 of the crash box 30 is positioned outward of the outer end 43 of the bumper reinforcement 40 in the vehicle width direction at the normal time. Also, in the vehicle width direction, the box outer-side wall 31b of the box main body 31 of the crash box 30 is positioned outward of the outer end 43 of the bumper reinforcement 40. It is to be noted that the box inner-side wall 31c of the box main body 31 of the crash box 30 is positioned inward of the outer end 43 of the bumper reinforcement 40, in the vehicle width direction. That is, in the vehicle width direction, the outer end 43 of the bumper reinforcement 40 is positioned between the box outer-side wall 31b of the box main body 31 and the box inner-side wall 31c.

As shown in FIG. 1, the bumper reinforcement 40 is provided to extend in the vehicle width direction. The bumper reinforcement 40 includes a central portion 40a positioned at least in the center in the vehicle width direction and ends 40b in the width direction. The ends 40b in the width direction are respectively positioned at both sides of the central portion 40a in the vehicle width direction. The ends 40b in the width direction extend outwards in the vehicle width direction and extend obliquely or extend to be curved toward the rear side of the vehicle, and the ends 40b in the width direction are positioned rearward of the central portion 40a.

The cross sectional shape of the bumper reinforcement 40 orthogonal to the extending direction (transverse cross sectional shape) is a "C" shape open to the rear side of the vehicle. It is to be noted that the transverse cross sectional shape of the bumper reinforcement 40 may be a hat shape open to the rear side of the vehicle or may be a rectangle.

As shown in FIG. 2, the bumper reinforcement 40 includes the rear wall 41 having a rear-side surface of the bumper reinforcement 40, and a front wall 42 having a front-side surface of the bumper reinforcement 40. The bumper reinforcement 40 is coupled to the front-side plate 32 of the crash box 30 at the rear wall 41 in the end 40b in the width direction, using the bolt 71. In the front wall 42 of the bumper reinforcement 40, a through-hole 42a passing through the front wall 42 is formed.

The through-hole 42a is formed ahead of the bolt 71. Therefore, at the time of screwing the bolt 71 into the weld nut 70, it is possible to insert the bolt 71 into the weld nut 70 using the through-hole 42a and screw the bolt 71 into the weld nut 70 using a fastening tool (not shown).

The absorber 50 is made of a resin and is a molded product. The absorber 50 is not particularly limited, and may be made of a foamed resin material, and the foamed resin material is, for example, expanded polypropylene (EPP, foamed polypropylene). The absorber 50 is provided forward of the bumper reinforcement 40 and extends in the vehicle width direction. Although the absorber 50 is formed with a plurality of components, the absorber 50 may be formed with one component to reduce the number of components.

The absorber 50 is supported by the bumper reinforcement 40. Specifically, the absorber 50 is supported by the bumper reinforcement 40 by allowing at least one projection 51 formed to project toward the rear side of the vehicle to be deformed and inserted from the front side in the vehicle front-rear direction through the through-hole 42a of the bumper reinforcement 40. In addition, a bumper cover 60 is provided forward of the absorber 50 and close to the absorber 50 such that the occurrence of the projection 51's coming out of the through-hole 42a and the absorber 50's escaping from the bumper reinforcement 40 is suppressed by the bumper cover 60 accordingly. A front-side surface 50a of the absorber 50 is parallel or substantially parallel to a rear-side surface (rear surface) 60a of the bumper cover 60, the bumper cover 60 being positioned forward of the front-side surface 50a.

The absorber 50 includes a main body 52 and widened sections 53. In the vehicle width direction, the main body 52 is positioned inward of the outer end 43 of the bumper reinforcement 40 in the vehicle width direction. In the vehicle width direction, the widened sections 53 are positioned outward of the outer ends 43 of the bumper reinforcement 40 in the vehicle width direction.

The projection 51 is provided on the main body 52 to project toward the rear side of the vehicle, from a rear-side surface 52a of the main body 52. The main body 52 is provided to occupy almost the whole space between the bumper reinforcement 40 and the bumper cover 60 in the vehicle front-rear direction.

The widened sections 53 are provided outward of both ends of the main body 52 in the vehicle width direction. The widened section 53 is provided to occupy almost the whole space between the front-side plate 32 of the crash box 30 outward of the bumper reinforcement 40 in the vehicle width direction and the bumper cover 60, in the vehicle front-rear direction. The widened section 53 is formed in a solid state without having a cavity inside and a recess on the surface. This is for suppressing the breakage of the widened section 53 when the absorber 50 is pushed toward the rear side of the vehicle due to the load input from the collision barrier 100. That is, in a case of the widened section 53 being formed to have a cavity and the like inside, the thickness around the cavity and the like is thinned, which makes the widened section 53 easy to break. In contrast, in a case of the widened section 53 being formed in a solid state, there is no thinned portion in the widened section 53, which leads to the suppression of breakage of the widened section 53. The outer surface 53a of the widened section 53 in the vehicle width direction is a surface that is inclined toward the front side of the vehicle and inward in the vehicle width direction so as to reduce the material cost of the absorber 50.

The widened section 53 has a bulging portion 54 bulging toward the rear side of the vehicle. The bulging portion 54 bulges in a direction approaching the front-side plate 32 of the crash box 30. In the vehicle front-rear direction, a rear-side surface 54a of the bulging portion 54 is at substantially the same position as the rear wall 41 at the end 40b of bumper reinforcement 40 in the vehicle width direction. The rear-side surface 54a of the bulging portion 54 is parallel or substantially parallel to a front-side surface 32c of the front-side plate 32 of the crash box 30. The inner part 54a1 of the rear-side surface 54a of the bulging portion 54 in the vehicle width direction is positioned inward of the outer end 33 of the crash box 30 in the vehicle width direction, and also is positioned forward of the front-side plate 32 of the crash box 30 to face the front-side plate 32. The outer part 54a2 of the rear-side surface 54a of the bulging portion 54 in the vehicle width direction is positioned outward of the outer end 33 of the crash box 30 in the vehicle width direction, and also positioned forward of the front-side plate 32 of the crash box 30 in the vehicle front-rear direction to face the front-side plate 32.

An inner-side surface 54b of the bulging portion 54 in the vehicle width direction is positioned outward of the bumper reinforcement 40 in the vehicle width direction to face the bumper reinforcement 40. A gap S is provided between the inner-side surface 54b of the bulging portion 54 in the vehicle width direction and the bumper reinforcement 40. The gap S is provided so as to absorb the manufacturing errors of the bumper reinforcement 40 and the absorber 50 in the vehicle width direction. Since the gap S is provided, even if there are manufacturing errors in the bumper reinforcement 40 and the absorber 50, the manufacturing errors can be absorbed by the gap S, and the absorber 50 can be assembled to the bumper reinforcement 40 without the bulging portion 54 interfering with the bumper reinforcement 40.

The outer end 55 of the absorber 50 in the vehicle width direction at a normal time is present in the widened section 53. The outer end 55 of the absorber 50 is positioned outward of the outer end 43 of the bumper reinforcement 40 in the vehicle width direction. Furthermore, the outer end 55 of the absorber 50 is positioned outward of the outer end 33 of the crash box 30 in the vehicle width direction.

When an oblique collision occurs, the bumper cover 60 is pushed back toward the rear side of the vehicle by the collision barrier 100 and the absorber 50 is pushed back toward the rear side of the vehicle by the pushed bumper cover 60. Therefore, (i) the main body 52 of the absorber 50 is compressed and deformed between the bumper reinforcement 40 and the bumper cover 60, and the load from the collision barrier 100 is transferred to the crash box 30 through the absorber 50 and the bumper reinforcement 40. In addition, (ii) the widened section 53 of the absorber 50 is compressed and deformed outward of the bumper reinforcement 40 in the vehicle width direction and between the front-side plate 32 of the crash box 30 and bumper cover 60 and the load from the collision barrier 100 is transferred to the crash box 30 through the absorber 50. As a result, the crash box 30 is compressed and deformed (crushed).

Figure 3:
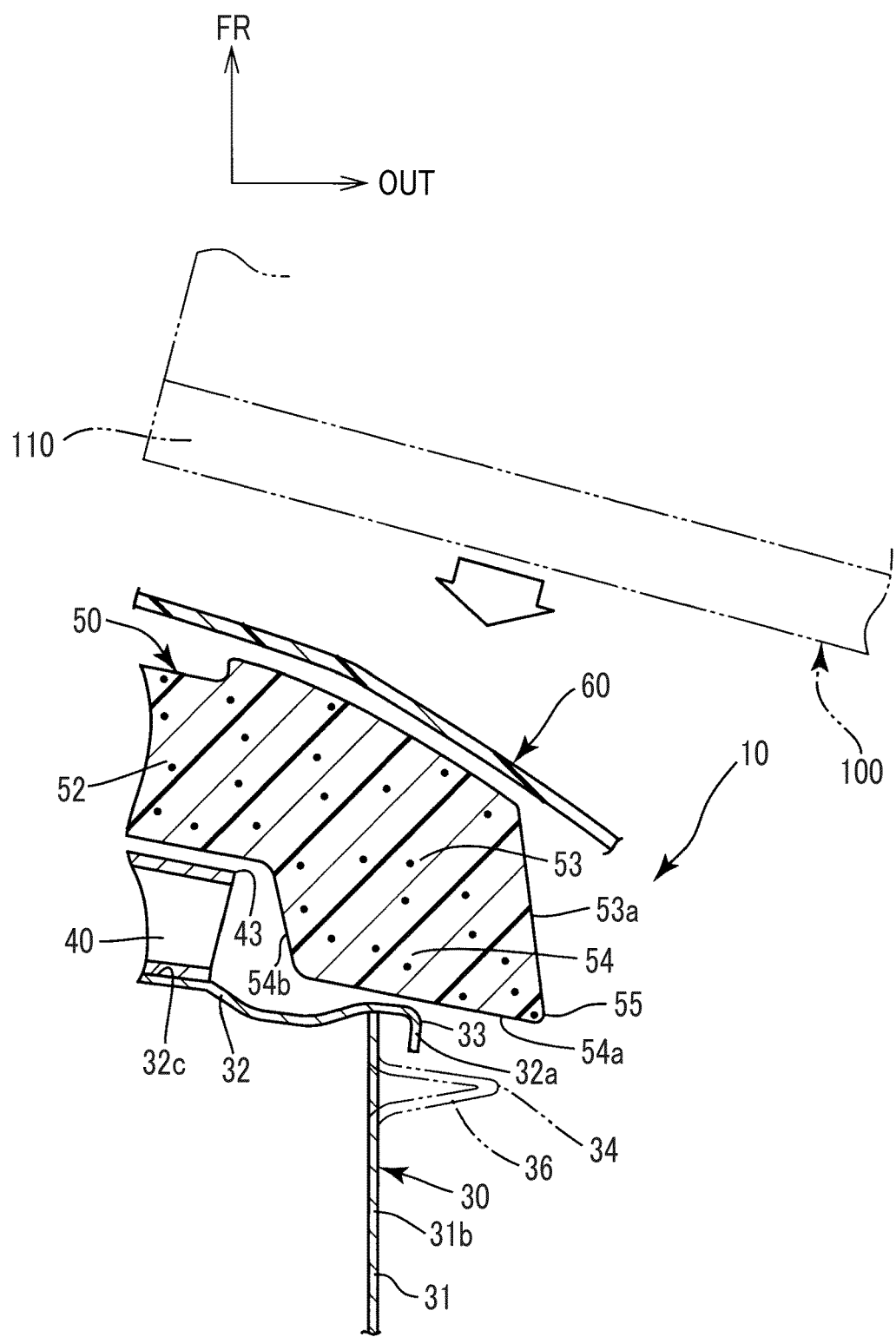
FIG. 3 is a partially enlarged sectional view of the vehicle front structure according to the embodiment of the disclosure when, in the vehicle width direction, an outer end of an absorber in a vehicle width direction at the normal time is positioned outward of an outer end of a crash box in the vehicle width direction in predicted deformation by an oblique collision.

As shown in FIG. 3, when the crash box 30 is compressed and deformed (crushed) by the oblique collision, an edge 36 projecting outward in the vehicle width direction may be created in the box outer-side wall 31*b*. Also, the distal end of the edge 36 may be positioned outward of that of the outer end 33 of the crash box 30 in the vehicle width direction at the normal time and may be the outer end of the crash box 30.

Therefore, the length of the absorber 50 in the vehicle width direction may be desirably set such that, in the vehicle width direction, the outer end 55 of the absorber 50 at the normal time is positioned outward of the position (the position of the distal end of the edge 36) of the outer end 34 of the crash box 30 in the vehicle width direction in predicted deformation by the oblique collision. The outer end 34 of the crash box 30 in the vehicle width direction in predicted deformation by the oblique collision may be predicted using a computer (computer aided engineering (CAE) prediction), may be predicted by performing one or more collision tests, and may be predicted using both of them mentioned above. In addition, considering errors, the outer end 55 of the absorber 50 is desirably positioned, for example, 8 mm or more outward of that of the outer end 34 of the crash box 30 in the vehicle width direction in the predicted deformation by the oblique collision.

That is, a method of producing the vehicle front structure 10 includes (i) obtaining the position of the outer end 34 of the crash box 30 in the vehicle width direction in the predicted deformation by the oblique collision, and (ii) fabricating an absorber 50 by determining the length of the absorber 50 in the vehicle width direction such that, in the vehicle width direction, the outer end 55 of the absorber 50 in the vehicle width direction at the normal time is positioned outward of an outer end 34 of the crash box 30 in the vehicle width direction in the predicted deformation by the oblique collision.

Then, the absorber 50 fabricated through (i) and (ii) in this order is assembled to the bumper reinforcement 40. In this way, the method of producing the vehicle front structure 10 includes assembling the absorber 50 to the bumper reinforcement 40 (assembling the absorber 50 to the vehicle), after (ii) above.

Next, the operation and effect of the embodiment of the disclosure are as follows.

(A) Since the outer end 55 of the absorber 50 is positioned outward of the outer end 43 of the bumper reinforcement 40 in the vehicle width direction, the projecting of the edge 36 outward of the absorber 50 in the vehicle width direction can be suppressed compared with a case where the outer end 55 of the absorber 50 is positioned to be lined up with or inward of the outer end 43 of the bumper reinforcement 40 in the vehicle width direction, even when the crash box 30 is crushed and the edge 36 projecting outward in the vehicle width direction is created in the crash box 30. Therefore, even when the outer end 33 of the crash box 30 at the normal time is positioned outward of the outer end 43 of the bumper reinforcement 40 in the vehicle width direction, it is possible to suppress the contact of the edge 36 created in the crash box 30 with the collision barrier 100 (a facing sheet 110 of the collision barrier 100).

(B) Since the outer end 55 of the absorber 50 is positioned outward of the outer end 33 of the crash box 30 at the normal time in the vehicle width direction, the projecting of the edge 36 created in the crash box 30 outward of the absorber 50 in the vehicle width direction can be suppressed compared with the case (A). Therefore, it is possible to effectively suppress contact of the edge 36 created in the crash box 30 with the collision barrier 100.

(C) Since the outer end 55 of the absorber 50 is positioned outward of the outer end 34 of the crash box 30 in the predicted deformation by the oblique collision in the vehicle width direction, it is possible to cover the edge 36 created in the crash box 30 in the oblique collision with the absorber 50 with respect to the front side of the vehicle. Therefore, it is possible to reliably suppress contact of the edge 36 created in the crash box 30 in the oblique collision with the collision barrier 100.

(D) Since the bending portion 32*a* bent toward the rear side of the vehicle such that the corner has an R shape is formed on the outer end of the front-side plate 32 in the vehicle width direction, when the absorber 50 is pushed toward the rear side of the vehicle by the load input from the collision barrier 100 and comes into contact with the front-side plate 32 of the crash box 30, it is possible to suppress breakage of the absorber 50 by the outer end of the front-side plate 32 in the vehicle width direction.

(E) Since the rear-side surface Ma of the bulging portion 54 of the absorber 50 is parallel or substantially parallel to the front-side surface 32*c* of the front-side plate 32 of the crash box 30, when the absorber 50 is pushed toward the rear side of the vehicle by the load input from the collision barrier 100 and comes into contact with the front-side plate 32, it is possible to bring the absorber 50 into surface contact with the front-side plate 32. Therefore, it is possible to disperse stress applied to the absorber 50 from the front-side plate 32 and to suppress breakage of the absorber 50 by the front-side plate 32.

(F) Since contact of the edge 36 created in the crash box 30 with the collision barrier 100 is suppressed in the absorber 50, it is possible to reduce the weight of the vehicle front structure 10 compared with a case where the bumper reinforcement 40 suppresses the contact by increasing the length of the bumper reinforcement 40 in the vehicle width direction.

(G) The method of producing the vehicle front structure according to the embodiment of the disclosure includes fabricating the absorber 50 by determining the length of the absorber 50 in the vehicle width direction such that, in the vehicle width direction, the outer end 55 of the absorber 50 at the normal time is positioned outward of the outer end 34 of the crash box 30 in predicted deformation by the oblique collision. In this way, even when the crash box 30 is crushed in the oblique collision and the edge 36 projecting outward in the vehicle width direction is created in the crash box 30, it is possible to cover the edge 36 with the absorber 50 with respect to the front side of the vehicle. Therefore, even when the outer end 33 of the crash box 30 at the normal time is positioned outward of the outer end 43 of the bumper reinforcement 40 in the vehicle width direction, it is possible to reliably suppress the contact of the edge 36 created in the crash box 30 with the collision barrier 100 in the oblique collision.

What is claimed is:

1. A vehicle front structure, comprising:
   a crash box provided between a front end of a front side member extending in a vehicle front-rear direction, and a bumper reinforcement extending in a vehicle width direction; and
   an absorber provided forward of the bumper reinforcement in the vehicle front-rear direction, the absorber extending in the vehicle width direction,
   wherein, in the vehicle width direction, an outer end of the crash box in the vehicle width direction is positioned outward of an outer end of the bumper reinforcement in the vehicle width direction,
   wherein, in the vehicle width direction, an outer end of the absorber in the vehicle width direction is positioned outward of the outer end of the bumper reinforcement in the vehicle width direction, and
   wherein a rear-side surface of a bulging portion of the absorber is in front of and substantially parallel to a front-side surface of a front-side plate of the crash box.

2. The vehicle front structure according to claim 1, wherein in the vehicle width direction, the outer end of the absorber in the vehicle width direction is positioned outward of the outer end of the crash box in the vehicle width direction.

3. The vehicle front structure according to claim 1, wherein in the vehicle width direction, the outer end of the absorber in the vehicle width direction is positioned outward of a bending portion at the outer end of the crash box in the vehicle width direction, the bending portion being bent reward in the vehicle front-rear direction.

* * * * *